United States Patent [19]
Jung

[11] 3,942,389
[45] Mar. 9, 1976

[54] WORM GEAR APPARATUS

[76] Inventor: Heinz Jung, Uhlandstrasse 6, D-6550 Bad Kreuznach, Germany

[22] Filed: Mar. 17, 1975

[21] Appl. No.: 559,223

[52] U.S. Cl. .................................... 74/458; 74/425
[51] Int. Cl.² ..................... F16H 1/16; F16H 55/04
[58] Field of Search ............................ 74/458, 425

[56] References Cited
UNITED STATES PATENTS

| | | | |
|---|---|---|---|
| 3,106,103 | 10/1963 | Smith .................................... | 74/458 |
| 3,186,082 | 6/1965 | Ulrich, Jr. et al. ............... | 74/458 UX |
| 3,845,669 | 11/1974 | Pickles .............................. | 74/458 X |

*Primary Examiner*—Leonard H. Gerin
*Attorney, Agent, or Firm*—Woodhams, Blanchard and Flynn

[57] ABSTRACT

A worm gearing having a worm and worm gear in meshing engagement. The worm consists of a thread which is produced by winding a strandlike member into a helix configuration. The strandlike member has two rows of projections and recesses on opposite sides of the strand which, in the wound-up condition, engage the projections and recesses of the next adjacent row to thereby prevent a relative reciprocal shifting therebetween during use thereof.

11 Claims, 6 Drawing Figures

WORM GEAR APPARATUS

FIELD OF THE INVENTION

The invention relates to a worm gear apparatus having a worm and a worm gear in meshing engagement and the worm consists of a thread which is produced by winding a strandshaped member.

BACKGROUND OF THE INVENTION

Known worm gearings of this type serve to transmit relatively small torques. In the gearing arrangement according to German Patent No. 253,658, which for example is used for driving a contact roller for advertisement illumination purposes, the worm grips around the worm gear over 180° of the periphery thereof. The worm gear consists of a soft material, into which the worm windings are to cut grooves. In a further known gearing (U.S. Pat. No. 3,220,278), which for example is used for driving a tape recorder, the worm gear has a plurality of teeth right from the start. The worm surrounds the worm gear over an angle of 270°. A special advantage of such worm gearings is that a larger number of threads can simultaneously engage the worm gear. However, a gearing of the above-mentioned type is also known (U.S. Pat. No. 2,635,479), in which the worm has a straight axis. The worm can for the purpose of an uncoupling be released by means of a movement mechanism from its engagement with the worm gear. The elasticity of the worm is to prevent impacts during recoupling.

It has been proven that the known gearings of the abovementioned type are only suited for transmitting larger torques, if a longer lifetime of the gearings is not important. The lifetime of the gearings is limited because the worm, depending on the direction of rotation, is either pulled together or widened. Both the diameter and also the thread change hereby, through which a clamping occurs between the worm thread and the teeth of the worm gear. This leads relatively quickly to a breakage of the worm so that such gearings do not reach the service life which is necessary, for example for a car window gearing or other adjusting gearings, for example for roller shutter operations.

The basic purpose of the invention is to construct in a gearing of the above-mentioned type a worm so that the windings can no longer shift relative to one another.

This purpose is attained according to the invention by the strandlike member having two rows of projections and recesses, whereby in wound-up condition of the strandlike member the projections of the one row engage the recesses of the other row to prevent a relative reciprocal shifting between the adjacent windings.

In a so constructed worm gearing, a reciprocal shifting of the windings is neither possible in the sense of a pulling together of the worm nor in the sense of a widening of the worm, since the positive engagement of the projections in the recesses prevent reciprocal shiftings between the windings. Thus the worm maintains at all times its diameter and therefore fits with the provided clearance into the teeth of the worm gear, so that damaging jammings are avoided. Through this a much greater lifetime for the worm can be achieved.

The projections and recesses may have many different shapes. For example, tooth profiles are advantageous so that so to speak two racks are provided on the strandlike member.

The projections and recesses of the one row can be offset with respect to the projections and recesses of the other row, however, they must not have such an offset. The offset depends on the desired diameter of the worm and, therefore, differs from case-to-case.

The projections and recesses can be constructed wedge-shaped in such a manner that the spacing between the side edges of the projections, seen in peripheral direction of the worm and which lie opposite to one another, decreases from the outside edge thereof to the inside edge. As a result, radial planes on the side surfaces of the projections and recesses which go through the axis of the worm extend fan-shaped with respect to one another, so that an abutment of the projections in the recesses can only be accomplished over the entire radial thickness of said projections and recesses by the utilization of a wedge shape. However, one can also do without this, in particular when the radial thickness of the projections and recesses is small in relationship to the diameter of the worm.

The strandlike member may have an approximately T-shaped cross section, whereby the T-shaped strand forms the teeth engaging the worm gear teeth and the T-crossbeam forms a foot flange lengthwise along the two side edges at which the projection/recess rows are arranged. Such a strandlike member can be wound up particularly well to a worm, because the foot flange forms a good abutment surface for resting on a winding mandrel.

In a different embodiment of the invention, the strandlike member has an approximately cross-shaped cross section, whereby one crossbar forms the thread engaging the worm gear teeth and two crossbars which lie opposite one another form flanges, lengthwise the edges of which the projection/recess rows are arranged. Such a strandlike member is particularly advantageous with respect to the rigidity thereof, because fixation against shifting lies close to the stressed threads. The worm may be constructed both with one thread or also with several threads. In the latter case, several strandlike members are wound-up parallel with one another. By using worms which have a plurality of threads thereon enables the transmission of large forces.

The axis of the worm may be straight. In this case, the advantage is utilized that the worm can be manufactured inexpensively. In a preferred embodiment of the invention, however, the axis of the worm is curved over at least a portion of its length so that several threads simultaneously engage the worm gear. Here the advantage mentioned in the beginning is utilized, that a flexible worm can be adjusted to the worm gear. It is then possible to transmit with a relatively thin worm relatively large torques, so that the gearing can be constructed very flat.

The strandlike member may consist of any suitable material. Suitable is for example, metal, in particular steel, if we deal with the transmission of greater forces. In transmitting smaller forces, nonmetallic materials can also be used, thus, for example, plastic.

BRIEF DESCRIPTION OF THE DRAWING

Exemplary embodiments of the invention are illustrated in the drawing, in which.

DETAILED DESCRIPTION

Figure 1:
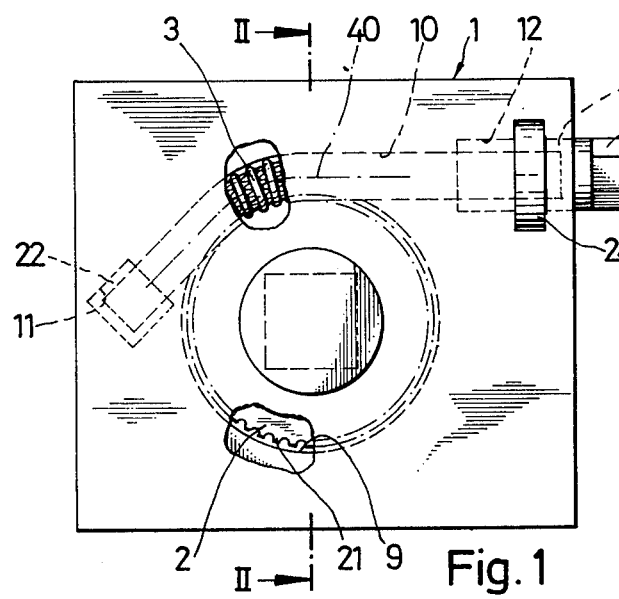
FIG. 1 is a partially cut-open side view of a worm gearing arrangement.
Figure 2:
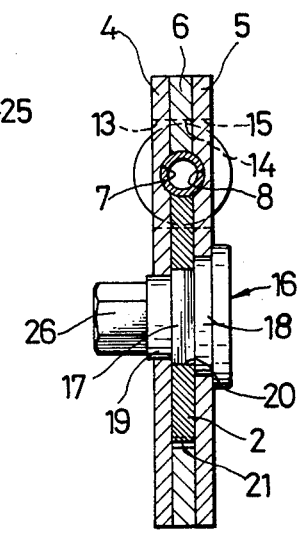
FIG. 2 is a cross-sectional view taken along the line II—II in FIG. 1.

The main parts of the gearing apparatus are, according to FIGS. 1 and 2, a housing 1, a plate-shaped worm gear 2 and a worm 3. The structure of these main structural parts and their cooperation will be discussed in detail hereinbelow.

The housing 1 consists of two laterally spaced plates 4, 5 and a center spacer plate 6. The plates 4, 5 and 6 are connected by means of not illustrated connecting means, for example by means of screws. Grooves 7, 8 are provided in the interfacing sidewalls of the plates 4, 5 and receive the worm 3 therein. The center plate 6 has a circular opening 9 therein for receiving the worm gear 2. Furthermore, the center plate 6 has an elongated slot 10 therein for receiving the worm, which slot has enlargements 11 and 12 at its ends. Aligning windowlike openings 13, 14 and 15 exist in the side plates 4, 5 and in the center plate 6.

A pin 16 is supported approximately in the center of the housing, which pin is graduated several times and also has a polygon cross section part 17, here square. The sections 18 and 19 serve to support the pin. The polygon section 17 engages a polygon-shaped hole 20, here square, in the center of the worm gear 2. The worm gear 2 has teeth 21 on its periphery.

The worm 3 consists of a strandlike member which will be described later on and has a sleeve 22 secured thereto at its one end, which sleeve is supported in one of the enlargements 11 in the slot. A bearing part 23 is fixedly connected to the other end of the worm, which bearing part is received in the other enlargement 12 in the slot. The bearing part 23 has a flange 24, which projects through the aligned windowlike openings 13, 14, 15 to fix the worm against an axial displacement. A drive shaft is connected at 25 and a not illustrated driven shaft is connected to the pin 16 at the end indicated by reference numeral 26.

The strandlike member, of which the worm 3 is comprised, is illustrated more in detail in FIGS. 3 to 6. As a whole, the strandlike member has the reference numeral 27. As can be seen from FIG. 4, the cross section of the strandlike member is approximately T-shaped. The thick T-stem 28 has a rounded end portion 29 and forms the actual thread. The arms 30 and 31 of the T form end flanges. As can be seen from FIG. 3, these edge flanges 30 and 31 have teeth formed therein. The teeth are identified on one side by reference numeral 32 and on the other side by reference numeral 33, while the gaps between the teeth on one side are identified by reference numeral 34 and on the other side by reference numeral 35. The teeth 32, 33 form projections, which fit into the recesses formed by the gaps 34, 35 between the teeth 32, 33. The teeth 32 on the one side are offset by an amount V with respect to the teeth 33 of the other side. The radial thickness s of the edge flange 30, 31 is relatively small.

To manufacture a worm, the strandlike member 27 is wound onto a winding mandrel, whereby the foot surface 36 rests on the winding mandrel. This very substantially simplifies the winding, because the T-stem 28 of the strandlike member extends radially outwardly and is achieved automatically by reason of the abutment of the surface 36 on the mandrel. During this winding up, the teeth of the one row are inserted into the gaps between the teeth of the next adjacent row. The displacement V depends on the diameter of the worm. There are also instances in which a displacement V does not exist, because the displacement is then, so to speak, a whole multiple of the tooth pitch.

Figure 3:
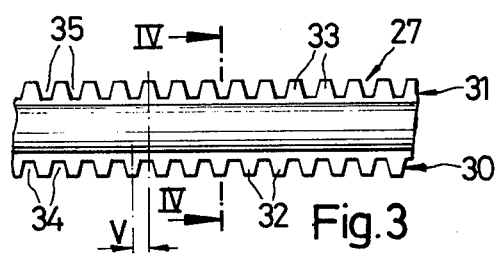
FIG. 3 is a top view of a strandlike member for the manufacture of a worm.
Figure 4:
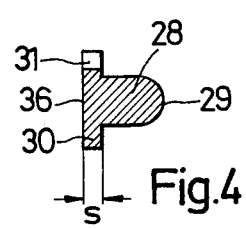
FIG. 4 is a cross-sectional view taken along the line IV—IV of FIG. 3.
Figure 5:
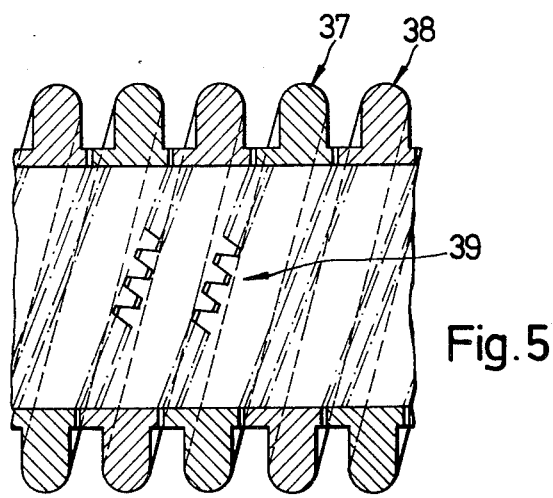
FIG. 5 is an enlarged diametrical cross-sectional view of a straight worm.
Figure 6:
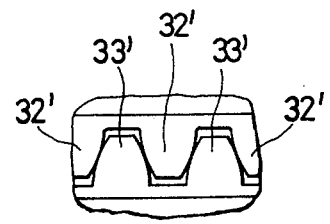
FIG. 6 is an enlarged illustration of an area, in which two adjacent worm windings engaged.

FIG. 5 illustrates a double threaded worm. It consists of two strandlike members 37 and 38, which are constructed like the strandlike member 27. Both of the strandlike members 37 and 38 are wound parallel. The engagement of the teeth with one another is illustrated at 39 where a fragment thereof is shown. FIGS. 3, 4 and 5 illustrates teeth 32, 33 having straight flanks. FIG. 6 shows that it is also possible to use teeth with curved or involute flanks.

From inspecting the drawing, in particular FIG. 5 (at 39) and FIG. 6, it is clear that through the engagement of the teeth with one another a relative reciprocal shifting of the strandlike member under the effect of the driving torque is prevented. Through this, diameter and lead of the worm are maintained and a jamming of the worm windings 28 between the teeth 21 of the worm gear are avoided. As a result, a substantially longer lifetime can be achieved than without the toothing of the strandlike member.

As is shown in FIG. 1, the worm 3 has a curved axis 40 so that several worm windings simultaneously engage the worm gear 2. This permits at relatively small dimensions, the transmission of relatively large torques.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A worm gearing having a worm and a worm gear in meshing engagement and the worm consists of a thread, which is produced by winding a strandlike member, comprising the improvement wherein the strandlike member has two rows of projections and recesses, whereby in wound-up condition of the strandlike member, the projections of the one row engage the recesses of the other row to prevent a relative reciprocal shifting between the adjacent windings.

2. The improved worm gearing according to claim 1, wherein the rows of projections and recesses are constructed as teeth.

3. The improved worm gearing according to claim 1, wherein the projections and recesses of the one row are offset with respect to the projections and recesses of the other row.

4. The improved worm gearing according to claim 1, wherein the projections and recesses are constructed wedge-shaped in such a manner that the distance of their side surfaces which seen in peripheral direction of the worm lie opposite to one another decreases from outside to the inside.

5. The improved worm gearing according to claim 1, wherein the strandlike member has an approximately T-shaped cross section, whereby the T-stem defines the thread engaging the worm gear teeth and the T-crossbeam forms a foot flange, lengthwise the two side edges at which the projection/recess rows are arranged.

6. The improved worm gearing according to claim 1, wherein the strandlike member has an approximately cross-shaped cross section, whereby one crossbar forms the teeth engaging the worm gear teeth and two crossbars which lie opposite one another form flanges lengthwise the edges of which the projection/recess rows are arranged.

7. The improved worm gearing according to claim 1, wherein the worm has one thread.

8. The improved worm gearing according to claim 1, wherein the worm has several threads, preferably double thread, and consists of two or more strandlike members which are woundup parallel with one another.

9. The improved worm gearing accordingg to claim 1, wherein the axis of the worm is straight.

10. The improved worm gearing according to claim 1, wherein the axis of the worm is curved over at least a portion of its length so that several threads simultaneously engage the worm gear.

11. The improved worm gearing according to claim 1, wherein the strandlike member consists in a conventional manner of metal, preferably of steel.

* * * * *